Aug. 25, 1970  G. J. GRANIERI  3,526,003

CONTROL NETWORK FOR A BILATERAL THYRISTOR

Filed Dec. 14, 1967  2 Sheets-Sheet 1

INVENTOR.
GEORGE J. GRANIERI
BY Jefferson Ehrlich
ATTORNEY

INVENTOR.
GEORGE J. GRANIERI
BY
Jefferson Ehrlich
ATTORNEY

United States Patent Office 3,526,003
Patented Aug. 25, 1970

3,526,003
CONTROL NETWORK FOR A BILATERAL THYRISTOR
George J. Granieri, Piscataway, N.J., assignor to American Standard Inc., New York, N.Y., a corporation of Delaware
Filed Dec. 14, 1967, Ser. No. 690,619
Int. Cl. H03k 17/00
U.S. Cl. 307—252                                    10 Claims

ABSTRACT OF THE DISCLOSURE

This circuit employs a bilateral control network which may include a bilateral device, such as a thyristor switch, and a pair of steering diodes, all arranged to control the operation of a load, such as a motor. Such a control network may be arranged to vary the amount of power delivered to an AC load in accordance with a DC signal or a slowly varying AC signal; or it may be arranged to "make" or "break" the delivery of AC power to the load.

---

This invention resides principally in a network which may be employed to proportionately control the delivery of power to an AC load in response to a control signal, which may be a DC voltage or a slowly varying AC voltage. The control network may also be used to act as a switch to turn AC power "on" so as to feed a load or to turn the AC power "off" so as to disconnect or de-energize the load. The key components of this invention may comprise a silicon bilateral switch and two oppositely poled diodes serving as steering diodes to direct the current traversing the bilateral switch through one path to the load in response to the positive phase of the applied voltage and then through another path to the same load in response to the negative phase of the applied voltage.

When a forward voltage, for example, a positive voltage derived from an AC source is applied to the silicon bilateral switch, only a small or negligible forward current may flow through the device to the load until the applied voltage attains a predetermined value. When the applied predetermined voltage has been reached, the current from the source will flow through one of the diodes to direct the current through one path to the load and, when the applied voltage is reversed in polarity, the current traversing the switching device will be directed to the other diode and cause the current to traverse a different path to the same load. The combination of the switching device and the two steering diodes, therefore, constitute a network which, in response to a voltage of one polarity exceeding a predetermined value, will switch the network to transmit current in one direction and, when the applied voltage of the opposite polarity exceeds the same predetermined value, the arrangement will switch the current into the reverse direction. Such an arrangement will have special application in this invention for the continuous and efficient operation of a load from an AC source of voltage and the arrangement may be modified for various kinds of translating devices and for various desired operating effects, as will be apparent from this specification.

Figure 1A:
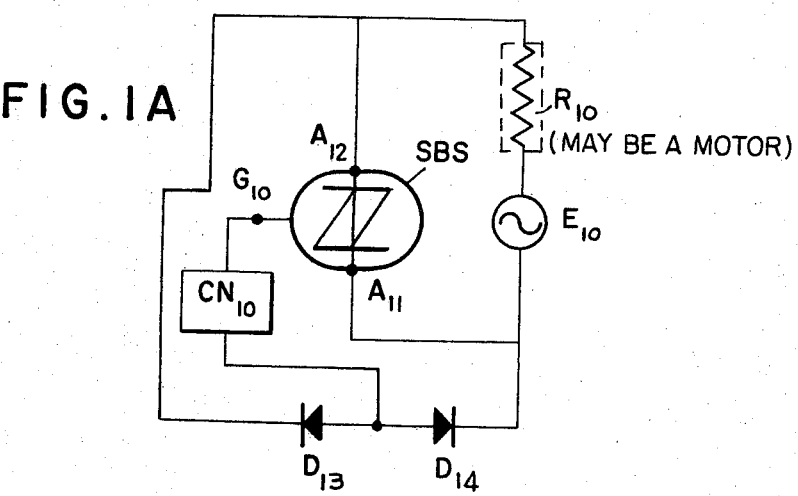
Figure 1B:
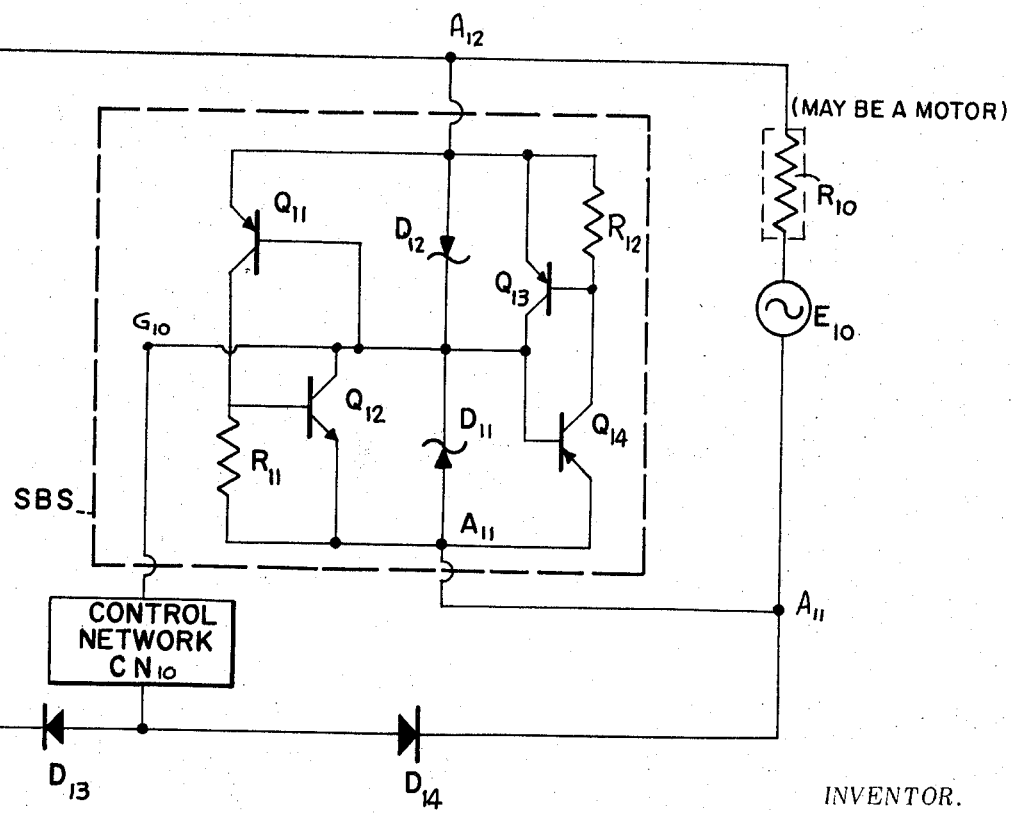
Figure 2:
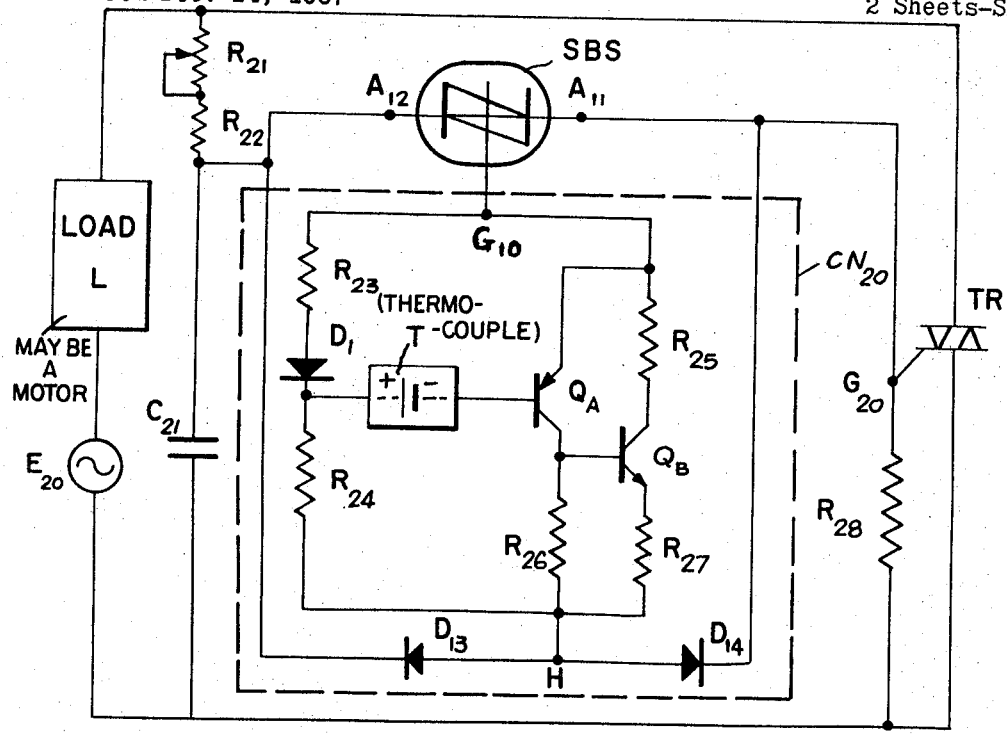
Figure 3:
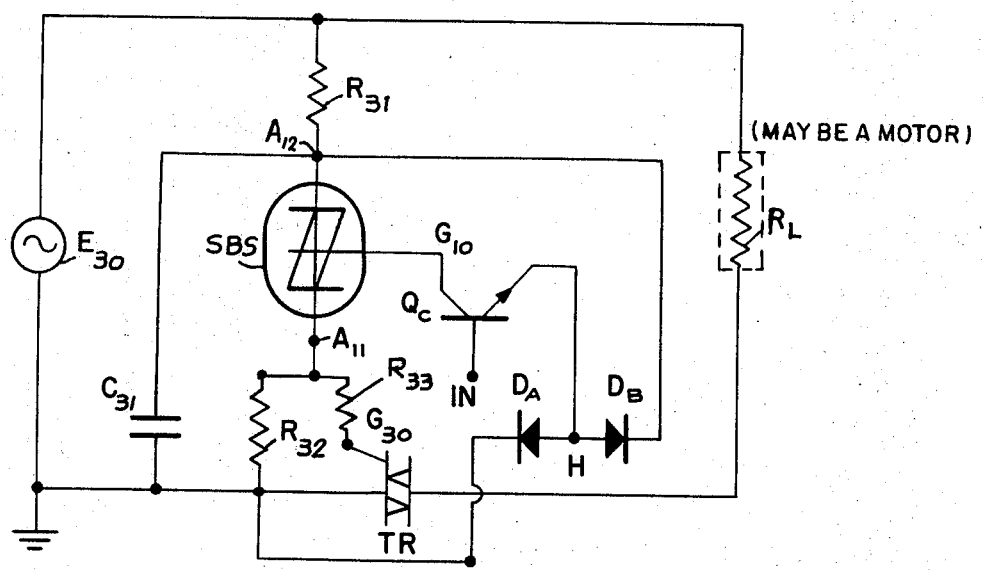

This invention and its features will be better understood from the more detailed description hereinafter following when read in connection with the accompanying drawing, in which FIG. 1A illustrates schematically a circuit to explain some of the general principles of this invention; FIG. 1B illustrates an equivalent circuit corresponding to the schematic arrangement of FIG. 1A; FIG. 2 represents one form of circuit for the control of a load, which may be a motor or other translating device; and FIG. 3 represents a somewhat different arrangement for the control of a load, which may be a gas valve, or a motor or any other translating device.

Referring more particularly to FIGS. 1A and 1B, the arrangement illustrates and includes a bilateral switch SBS, which may be what is often called a silicon bilateral switch, a pair of diodes, D13 and D14, sometimes hereinafter called switching diodes, a control network CN10 interconnecting the switching device SBS with the diodes D13 and D14, a source of alternating voltage E10, which may be any AC voltage source, and a generalized load R10 which is to be powered by the voltage source E10. The bilateral switch SBS may be, for example, a three-electrode integrated circuit, such as the General Electric Co.'s switch device 2N4992, one of the electrodes of which is a gate or control terminal as will become apparent from the following description.

FIG. 1B illustrates the same general arrangement as FIG. 1A, except that the equivalent circuit of the switching device SBS is shown, within the dotted lines, as including four transistors Q11, Q12, Q13, Q14, two diodes D11 and D12, and two resistors R11 and R12.

When the voltage applied by source E10 is below a predetermined value, no current or only a negligible current will flow through the device SBS to the load R10. But when the voltage of the source E10 exceeds the predetermined value and is of a positive polarity, current will flow through the device SBS over a circuit which includes source E10, load resistor R10, terminal A12, device SBS, terminal G10, network CN10, and diode D14 to terminal A11 and source E10. The flow of this current causes a larger current to flow from terminal A12 to terminal A11. The magnitude of this latter current corresponds to the impedance interposed by the load R10. This current will continue to flow through the device SBS to the load R10 even though the voltage of source E10 falls below the first mentioned predetermined value. On the other hand, if the polarity of the initial voltage E10 is in the opposite direction so that the voltage applied to the terminal A12 is negative by more than a predetermined value, current will traverse the switch SBS and load R10 over a circuit which includes source E10, terminal A11, device SBS, terminal G10, network CN10, diode D13, terminal A12 and load R10 to source E10.

The device SBS is a symmetrical, bilateral arrangement and it will continue to switch the current, so that the load R10 will remain substantially continuously supplied with power.

Before the voltage applied to the device SBS reaches the required breakdown value, in their normal operation all four transistors Q11, Q12, Q13, and Q14 (see FIG. 1B) will be nonconducting. Also, the diodes D11 and D12, which are Zener diodes, will not be conducting. However, as the potential difference between terminals A12 and A11 increases and the breakdown voltage of diode D11 is reached, current will then flow through the emitter and base electrodes of transistor Q11, thereby rendering transistor Q11 conductive. When this happens, a rising voltage will be produced across resistor R11 which, when it reaches a sufficient value, will render transistor Q12 conductive. Similarly, as the potential difference between the terminals A12 and A11 is reversed in polarity, eventually there will be sufficient voltage to breakdown diode D12 and thereby render the transistor Q14 conductive. The conductivity of diode D12 will result in a sufficient voltage across resistor R12 to effectuate the conductivity of transistor Q13.

Thus, the device SBS is rendered conductive when a sufficient positive voltage is applied to terminal A12 and, by symmetry, the device is rendered equally conductive again when a sufficient negative potential is applied to the terminal A11. By the addition of appropriate circuitry as hereinafter disclosed, AC power may be controllably transmitted to a load such as a motor or other translating device.

In FIG. 1B, the arrangement employs a control network CN10 to control or modulate the power supplied by source E10 to the load R10 without the necessity of employing a DC source of power supply. The diodes D13 and D14 act as the steering devices. When the terminal A12 is sufficiently positive to initiate the operation of device SBS, current will flow from source E10 through the circuit including the emitter-base junction of transistor Q11, gate terminal G10, control network CN10, diode D14 and terminal A11. On the other hand, when the terminal A12 receives a sufficiently high initiating negative voltage, current will flow from source E10, through terminal A11 through the emitter-base junction of transistor Q14, through control network CN10 and through diode D13 to terminal A12. The diodes D13 and D14 confine the current flow through the network CN10 to one direction only.

The magnitude of the impedance of the control network CN10 may be adjusted to any desired value and it will importantly determine when the switch SBS will become conductive. In accordance with this invention, the control circuit CN10 may be adjusted or otherwise activated, to range in impedance from a short circuit or zero impedance to an open circuit or infinite inpedance. Under a short circuit condition, the device SBS will interject the network CN10 with only a very small voltage difference appearing between the terminals A11 and A12. Under an open circuit condition, however, the device SBS will conduct current only when the breakdown voltages of diodes D11 and D12 are exceeded. Under any intermediate impedance condition, the device SBS will switch the network CN10 in response to some intermediate voltage which is less than the breakdown voltages of diodes D11 and D12. Thus, complete control of the power supplied to load R10 can be obtained merely by the appropriate choice of the impedance of network CN10.

Referring now to FIG. 2, there is shown schematically a load L, which may be a motor to be supplied from a source of voltage E20 of, for example, a 115 volt 60 Hz. supply. The activating circuit includes a series arrangement of potentiometer R21, resistor R22 and capacitor C21. The activating circuit is bridged by a triac TR which has a gate terminal G20. The arrangement of FIG. 2 also includes device SBS and steering diodes D13 and D14. The control network CN20 of this arrangement includes two transistors QA and QB as well as a diode D1 and the network equipment is shown within the dotted lines.

If it is assumed that the control network CN20 is disconnected, the voltage source E20 will transmit a charge to capacitor C21 which varies as and corresponds to the phase of the voltage. When the voltage applied to the capacitor C21 rises, the device SBS will break down after the voltage reaches a first or high predetermined value. The capacitor C21 then discharges through device SBS and resistor R28. As the voltage across resistor R28 reaches the critical value of the device TR, that device will become conductive and will remain conductive until the load current becomes a nullity or drops below a very low value. In other words, the device TR will continue to remain conductive to allow the normal current to flow through the load L. Hence, the load L, if it be a motor, will be operated as long as current continues to flow through the device TR.

On the other hand, if the voltage of the source E20 is the opposite polarity, the charge on capacitor C21 will be reversed in polarity and, when the voltage across capacitor C21 again reaches its corresponding predetermined value in the reverse direction, it will transmit current through the device SBS and resistor R28, then in turn activate device TR through gate G20, thereby rendering device TR conductive. As explained earlier, as soon as device TR becomes conductive, current will then flow from the source E20 through load L. The load L will continue to operate until the current through device TR drops below its cut-off value.

Now considering the influence of adding or re-connecting the control network CN20 to FIG. 2, it is noted that control network CN20 serves generally to control the breakdown voltage of the device SBS. As the impedance of the network CN20 is decreased, the breakdown voltage of the SBS device is reduced, and the full current through the load L via the device TR will be applied at an earlier stage in the cycle. On the other hand, as the impedance of the network CN20 is increased, the device SBS will become effective at a later stage in the cycle, that is, at a higher breakdown voltage, and the load L will continue to receive power from the source E20 until the device TR is effectively disconnected by the reduction in the current therethrough to its lower predetermined value.

Considering the network CN20 in further detail, when the voltage reaching capacitor C21 is positive, the voltage applied through the device SBS to the gate terminal G10 will also be positive, and current will flow through resistor R23, diode D1, resistor R24, terminal H, diode D14, resistor R28 and back to the lower terminal of capacitor C21. At the same time, current will also flow through a parallel path which includes the emitter and base electrodes of transistor QA, the device or source of voltage T, resistor R24, terminal H, diode D14, resistor R28 and back to the lower terminal of capacitor C21. In this arrangement, the device T may be a thermocouple of a thermistor or other device which may generate a voltage or exhibit a change in resistance which may vary with ambient conditions.

In the arrangement for FIG. 2 the voltage of device T is poled so as to aid the flow of current through the emitter-base circuit of transistor QA. Hence, the flow of current through the emitter-collector terminals of transistor QA will be varied depending upon the instantaneous voltage supplied by device T. Hence, if the aiding voltage of device T is high, a very large current will flow through the emitter-collector terminals of transistor QA, and vice versa. Hence, the current flowing through the emitter-collector terminals of transistor QA will control the voltage across resistor R26 and thereby vary the current which will reach the base electrode of the second transistor QB. Therefore, the current flowing through the base and collector electrodes of transistor QB as well as the conductivity of transistor QB will be correspondingly varied in response to the instantaneous voltage supplied by device T.

The transistor QB may be regarded as part of a variable resistance circuit which includes resistor R25, the collector and emitter electrodes of transistor QB and resistor R27. This variable resistance circuit serves as a means for controlling the flow of current through the load L. If the load L is a motor of variable or adjustable speed, the motor speed will be determined by the amount of resistance interposed by this circuit into the control network CN20. In accordance with this invention, this resistive circuit acts as a fine control for adjusting the speed of a motor or to control the operation of any other load device L.

As the voltage of source E20 is reversed in polarity, the terminals A11 and A12 of device SBS will be receiving reversed voltages, with terminal A11 rendered positive and terminal A12 negative. Current then flows from the terminal A11 through the gate G10 as before, and the circuitry is otherwise the same as above outlined, except that the steering diode D13 will feed the current back to the capacitor C21. The resistive circuit of network CN20 will control the magnitude of the current which will traverse the load L. It will be apparent that triac device TR may be replaced by any two appropriate oppositely poled devices, such as silicon-controlled rectifiers. Furthermore, any type of variable voltage generating device may be used in place of the device T to introduce an aiding voltage for the control of the impedance of the network.

FIG. 3 illustrates a modification of the foregoing arrangement, which includes an AC source E30, a load RL and a triac device TR. This circuit remains intact throughout, but the current will be supplied to the load RL so that the load RL will be operated in full or the circuit will be interrupted so that no current flows through load RL. This will be further explained.

As the voltage of source E30 increases, an increasing voltage will be developed across capacitor C31. When the increasing voltage across capacitor C31 reaches the breakdown voltage of the SBS device, current will then flow from source E30, through the circuit of resistor R31, terminal A12, the SBS device, terminal A11, and resistor R32 back to source E30. A parallel path will also be established around resistor R32 so that current from source E30 will flow over the same circuit but including the parallel path consisting of resistor R33 in series with gate G30 of the triac device TR (to return to source E30). The conductivity of the triac device TR will permit the source E30 to supply current to the load RL.

As so far described, the transistor QC is inert, that is, non-conductive, and it remains non-conductive until a positive voltage is applied to its base electrode from a control circuit IN. If the voltage from control circuit IN is of a sufficient positive magnitude, the base and emitter electrodes of the transistor QC will be rendered conductive. When this happens, current will then flow from source E30 through the circuit which includes resistor R31, the terminal A12, and the gate terminal G10 of device SBS, the collector and emitter electrodes of transistor QC, terminal H and diode DA, and ground. When the polarity of source E30 is reversed, i.e., rendered negative, the circuit will include terminal A11 and terminal G10 of device SBS, the collector and emitter electrodes of transistor QC, terminal H, diode DB and resistor R31. The impedance of this circuit will then remain substantially constant and at a relatively low value regardless of whether or not the polarity of the source E30 thereafter becomes positive or negative. Therefore, sufficient charge is not stored in capacitor C31 to supply sufficient gate current to the triac device TR to render the triac TR conductive even though the device SBS is fully conducting.

The addition of the control signal source IN and the transistor QC renders the arrangement capable of supplying power from the source E30 to the load RL only in response to the voltage condition of the control source IN. The absence of an applied positive voltage from circuit IN will permit the flow of current to the load RL. When the transistor QC is conductive, the collector-emitter electrodes of transistor QC provide, in the circuit just described, an impedance which is lower than the combined parallel impedances of the resistor R32, capacitor C31 and the device TR. Hence the device TR becomes non-conductive when positive voltage is applied by circuit IN to render transistor QC conductive. The transistor device QC, when rendered non-conductive, permits the flow of power from source E30 to the load RL. Thus, when transistor QC is non-conductive, device TR is conductive, and vice versa.

Two conditions must be satisfied in the FIG. 3 arrangement before the load RL will be supplied with full power from source E30. One of these conditions requires that the source E30 provide an initiating voltage exceeding a predetermined value in order to render the device SBS conductive. The second condition is met by the absence of a positive voltage on circuit IN of sufficient magnitude to render the transistor QC conductive. Unless both of these conditions are satisfied, source E30 will fail to supply power to the load RL.

Another feature of this invention involves the use of the transistor device QC as an effective shunt for the triac device TR. In such a shunt arrangement, the presence of a sufficient positive voltage on terminal IN will render the device TR non-conductive, and the load RL will be disengaged from source E30. On the other hand, when the control voltage at terminal IN is absent, or is below its assigned value, the device TR will be conductive if the switch SBS is also conductive, whereupon power will be supplied to load RL.

In accordance with another feature of this invention, the combination of switch SBS and the two related steering diodes DA and DB are employed to control the network for the purpose of switching AC power "on" or "off" with respect to the load, such as RL, which may be of any well known type. This arrangement is, therefore, superior to conventional arrangements for turning a load "on" or "off" or for adjusting the operation of the load, in that it requires a minimum of components and the control is positive and easily adjustable.

While this invention has been shown and described in certain particular arrangements merely for the purpose of illustration, it will be understood that the general principles of this invention may be applied to other and widely varied organizations without departing from the spirit of the invention or the scope of the appended claims.

What is claimed is:

1. Control apparatus for a line transmitting AC power to a load, comprising first and second bilateral switches, said first switch being connected in series in said line, and a voltage generating network connecting said second switch in shunt between said first switch and one side of said line to control the power supplied to the load in response to the voltage generated in said network, said network including a control circuit and two oppositely poled diodes to steer the current through said network so that said current traverses said network in only one direction.

2. Control apparatus as defined in claim 1, in which said network also includes a source of DC voltage to control the impedance of said network and thereby to control the flow of AC current through said load.

3. Control apparatus as defined in claim 1, in which said network also includes a source of DC voltage so that, in response to said DC voltage, said first switch will be rendered nonconductive to interrupt the flow of AC current through said load.

4. A control network for a bilateral thyristor switch for modulating the supply of power to a load, comprising a bilateral translating device, a circuit having two oppositely directed diodes connected to said device to cause AC voltages applied to said device to traverse said circuit in but one direction, said circuit including means to generate a voltage so as to control the impedance of said circuit, thereby to proportionately control the impedance of said thyristor switch and of the power transmitted therethrough to the load.

5. A control network according to claim 4, including, in addition, a load connected in series with said thyristor switch so that said thyristor switch will control the magnitude of the current through said load.

6. A control network according to claim 5 in which the load is a motor.

7. A control network according to claim 4 including therein a source of DC voltage for controlling the impedance of the circuit, and means responsive to the voltage of said source to render said thyristor switch nonconductive.

8. A control network according to claim 7, in which said source of DC voltage is a thermocouple.

9. Apparatus for controlling the flow of current from a power source to a load, comprising a bilateral switch having a gate terminal, an independently generated control voltage connected in circuit with the gate terminal of the bilateral switch to control the voltage at which the bilateral switch becomes conductive, and a triac device having a gate terminal which is connected to said bilateral switch, the triac device being rendered conductive when said bilateral switch is conductive, said triac device being connected in series with said power source and said load to permit current to flow to said load only when the triac device is conductive.

10. Apparatus according to claim 9, in which a pair of oppositely poled diodes are connected in circuit with the gate terminal of the bilateral switch to permit only unidirectional current to flow to the gate terminal of the bilateral switch.

References Cited

G.E. Application Note 200.35, May 1964 "Triac Control for AC Power" by E. K. Howell, p. 6.

Electronic Design, Aug. 30, 1966, "Thyristor Triggering is Sure Fire..." pp. 40–42.

DONALD D. FORRER, Primary Examiner

J. ZAZWORSKY, Assistant Examiner

U.S. Cl. X.R.

307—305; 315—196; 318—334, 345